United States Patent
Choi et al.

(10) Patent No.: US 11,654,822 B2
(45) Date of Patent: May 23, 2023

(54) LIGHTING DEVICE FOR VEHICLE

(71) Applicant: HYUNDAI MOBIS CO., LTD., Seoul (KR)

(72) Inventors: Ban Suk Choi, Yongin-si (KR); Seung Woo Baek, Yongin-si (KR); Hyoung Jin Choi, Yongin-si (KR); Jun Hyuk Cha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/568,998

(22) Filed: Jan. 5, 2022

(65) Prior Publication Data
US 2023/0057300 A1    Feb. 23, 2023

(30) Foreign Application Priority Data
Aug. 19, 2021    (KR) .......................... 10-2021-0109189

(51) Int. Cl.
| | |
|---|---|
| *B60Q 1/00* | (2006.01) |
| *B60Q 1/28* | (2006.01) |
| *B60Q 1/26* | (2006.01) |
| *F21S 43/15* | (2018.01) |
| *F21S 43/20* | (2018.01) |
| *F21Y 115/10* | (2016.01) |

(52) U.S. Cl.
CPC .............. *B60Q 1/28* (2013.01); *B60Q 1/2661* (2013.01); *F21S 43/15* (2018.01); *F21S 43/26* (2018.01); *F21Y 2115/10* (2016.08)

(58) Field of Classification Search
None
See application file for complete search history.

(56) References Cited

U.S. PATENT DOCUMENTS

| | | | |
|---|---|---|---|
| 10,598,333 B1 * | 3/2020 | Lee | F21S 43/249 |
| 2014/0078762 A1 * | 3/2014 | Adams | B60Q 1/18 |
| | | | 362/496 |

FOREIGN PATENT DOCUMENTS

| | | |
|---|---|---|
| DE | 102020133633 A1 | 7/2021 |
| KR | 1020200040014 A | 10/2018 |

OTHER PUBLICATIONS

Office Action dated Apr. 11, 2022 in the corresponding German Patent Application No. 102021006204.3.

* cited by examiner

*Primary Examiner* — Gerald J Sufleta, II
(74) *Attorney, Agent, or Firm* — NovoTechIP International PLLC

(57) ABSTRACT

Provided is a grill lighting device for a vehicle including a housing unit positioned on a vehicle body and having a shape whose one side is opened, a light source unit positioned on the housing unit and configured to emit light, a reflective unit provided in the housing unit and configured to reflect light emitted from the light source unit, and a screen unit positioned on the housing unit and configured to cover the opened portion of the housing unit and transmit the light reflected by the reflective unit to generate grill lighting.

13 Claims, 13 Drawing Sheets

LIGHTING DEVICE FOR VEHICLE

CROSS-REFERENCE TO RELATED APPLICATION

This application claims priority from and the benefit of Korean Patent Application No. 10-2021-0109189, filed on Aug. 19, 2021, which is hereby incorporated by reference for all purposes as if set forth herein.

BACKGROUND

Field

Exemplary embodiments of the present disclosure relate to a grill lighting device for a vehicle, and more particularly, to a lighting device for a vehicle, capable of generating a grill lighting while minimizing the number of light sources.

Discussion of the Background

In general, an engine room of a vehicle is provided therein with various heat exchangers such as a radiator, an intercooler, an evaporator, and a condenser for cooling parts in the vehicle such as an engine or adjusting the air temperature inside the vehicle as well as parts for driving such as an engine.

A heat exchange medium generally flows inside such heat exchangers, and the heat exchange medium inside the heat exchanger and air outside the heat exchanger exchange heat with each other, so that cooling or heat dissipation is achieved. Accordingly, in order for various heat exchangers inside the vehicle engine room to stably operate, it is of course that external air needs to be easily supplied into the engine room.

To this end, a front bumper of a vehicle is provided with a radiator grill so that external air flows into the engine room, and at least one radiator grill is provided according to the type and shape of a vehicle.

Meanwhile, electric vehicles that have been recently developed are improved in design by removing a radiator grill and generating grill lighting because an engine heated in an engine room is removed.

However, in the related art, since many light sources are used for generating grill lighting, there are problems in that the product cost increases and many light sources are driven and heated. Therefore, there is a need to solve such problems.

The background art of the present disclosure is disclosed in Korean Patent Publication No. 2020-0040014 (published on Apr. 17, 2020 and entitled "Lamp Integration Type Grill Lighting System and Vehicle thereof").

SUMMARY

The present disclosure has been made to solve the above problems, and an object of the present disclosure is to provide a lighting device for a vehicle, capable of implementing grill lighting while minimizing the number of light sources.

In order to solve the above problems, a lighting device for a vehicle in accordance with the present disclosure may include: a housing unit mounted on a vehicle body and having a shape whose one side is opened; a light source unit mounted on the housing unit and configured to emit light; a reflective unit provided in the housing unit and configured to reflect light emitted from the light source unit; and a screen unit mounted on the housing unit and configured to cover the opened portion of the housing unit and transmit the light reflected by the reflective unit to implement grill lighting.

The housing unit may be disposed on at least one of a front part, a side part, and a rear part of the vehicle body.

The housing unit may include: a housing rear part on which the reflective unit is formed; a housing upper part extending forward from an upper end of the housing rear part and configured to reflect light; and a housing lower part extending forward from a lower end of the housing rear part, disposed to face the housing upper part, and configured to reflect light.

The light source unit may include: a light source case part mounted on an edge of the housing unit; and a light source lamp part mounted on the light source case part and configured to emit light to the reflective unit when power is supplied thereto.

The light source unit comprises may further include a light source rotating part configured to rotate the light source case part.

The reflective unit may include: a reflective base part; a plurality of reflective protrusion parts protruding from the reflective base part; and a reflective surface part formed at an end of each reflective protrusion part and configured to reflect light of the light source unit emitted from a side.

The light source unit may be disposed at one edge of the housing unit, and the reflective surface part may be disposed to protrude further forward in a direction away from the light source unit.

The light source unit may be disposed at either edge of the housing unit, and the reflective surface part may be disposed to protrude further forward from an edge to a center of the reflective base part.

The reflective base part may have a planar surface, and lengths of the reflective protrusion parts adjacent to each other may be different from each other.

The reflection base part may have a curved surface, and lengths of the reflective protrusion parts may be substantially equal to or different from each other.

The reflective unit may be assembled to the housing unit.

The reflective unit may be integrally formed with the housing unit.

The screen unit may include: a screen body part mounted on the housing unit; a screen blocking part formed inside the screen body part and configured to block light transmission; and a screen transmitting part formed inside the screen body part and configured to allow light transmission.

In a lighting device for a vehicle in accordance with the present disclosure, light of a light source unit emitted from a side is reflected by a reflective unit to transmit a screen unit, which makes it possible to implement grill lighting for a vehicle while minimizing the number of light source units.

DETAILED DESCRIPTION OF THE ILLUSTRATED EMBODIMENTS

Figure 1:
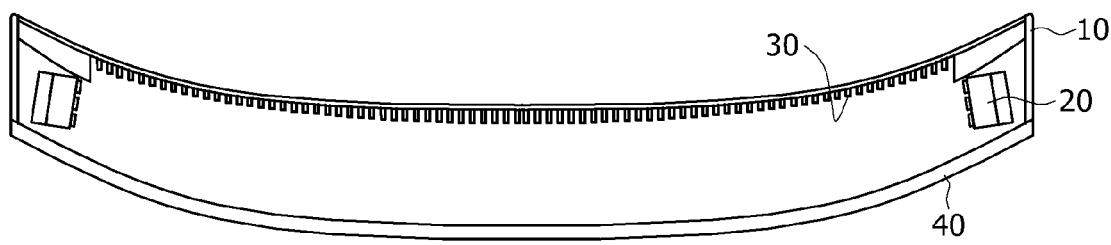
FIG. 1 is a view schematically illustrating a lighting device for a vehicle in accordance with an embodiment of the present disclosure.

Hereinafter, embodiments of a lighting device for a vehicle in accordance with the present disclosure will be described with reference to the accompanying drawings.

In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Figure 2:
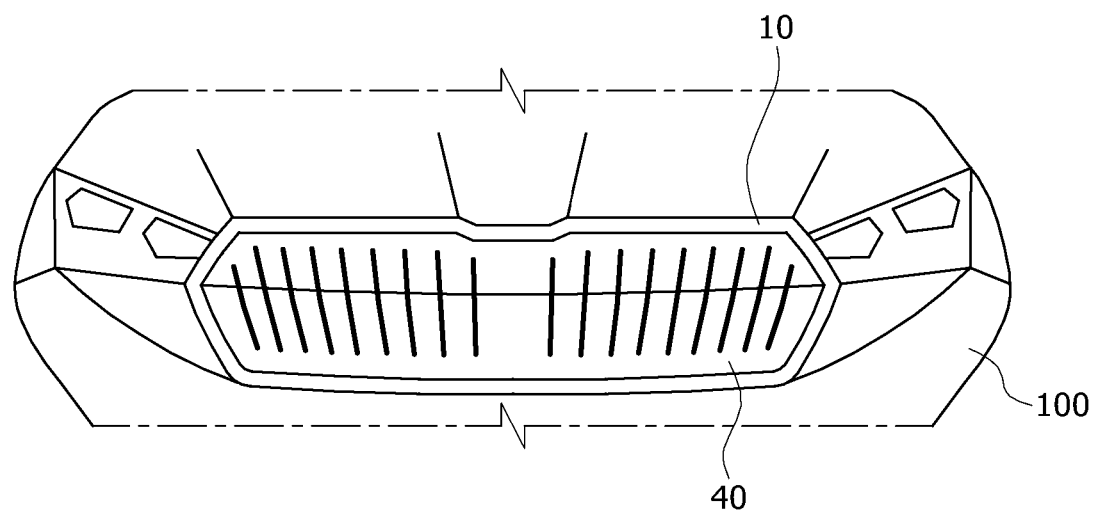
FIG. 2 is a view schematically illustrating a state in which the lighting device for a vehicle in accordance with an embodiment of the present disclosure is disposed.

FIG. 1 is a view schematically illustrating a lighting device 1 for a vehicle in accordance with an embodiment of the present disclosure, and FIG. 2 is a view schematically illustrating a state in which the lighting device 1 for a vehicle in accordance with an embodiment of the present disclosure is disposed. Referring to FIG. 1 and FIG. 2, the lighting device 1 for a vehicle in accordance with an embodiment of the present disclosure includes a housing unit 10, a light source unit 20, a reflective unit 30, and a screen unit 40.

The housing unit 10 is positioned on a vehicle body 100. The housing unit 10 has a shape whose one side is opened. For example, the housing unit 10 may have a shape whose front surface is opened. Furthermore, the housing unit 10 may have a shape whose both ends are opened.

The light source unit 20 is positioned on the housing unit 10 and emits light. For example, the light source unit 20 may be disposed at one end or either end of the housing unit 10 and emit light.

The reflective unit 30 is provided in the housing unit 10 and reflects light emitted from the light source unit 20. For example, the reflective unit 30 may be disposed on the rear surface of the housing unit 10, and reflect light, which is emitted from the light source unit 20 disposed at a side end of the housing unit 10, toward the opened front surface of the housing unit 10.

The screen unit 40 is positioned on the housing unit 10 to cover the opened portion of the housing unit 10, and transmits the light reflected by the reflective unit 30 to generate grill lighting. For example, the screen unit 40 may be assembled to the housing unit 10, and a light transmitting area of the screen unit 40 may be differently designed to generate grill lighting having various designs. Furthermore, the screen unit 40 may be selected and positioned on the housing unit 10 according to user's taste.

Meanwhile, the housing unit 10 is disposed on at least one of a front part, a side part, and a rear part of the vehicle body 100. For example, the housing unit 10 may be positioned on an electric vehicle, and may be disposed in a radiator grill area through which air passes to cool an engine room in an internal combustion engine vehicle. In addition, the housing unit 10 may be disposed in a door or trunk area.

Figure 3:
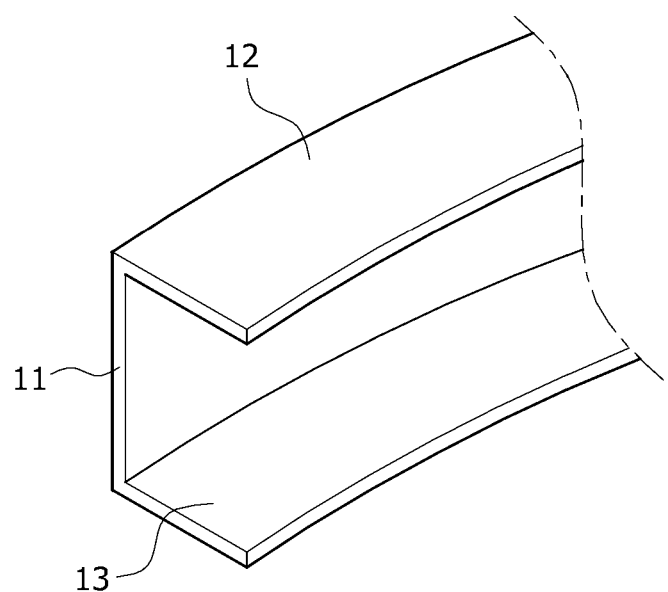
FIG. 3 is a view schematically illustrating a housing unit in accordance with an embodiment of the present disclosure.

FIG. 3 is a view schematically illustrating the housing unit 10 in accordance with an embodiment of the present disclosure. Referring to FIG. 3, the housing unit 10 in accordance with an embodiment of the present disclosure includes a housing rear part 11, a housing upper part 12, and a housing lower part 13.

The reflective unit 30 is formed on the housing rear part 11. For example, the reflective unit 30 may be disposed on the front surface of the housing rear part 11.

The housing upper part 12 extends forward from an upper end of the housing rear part 11. For example, the housing upper part 12 may suppress light loss by reflecting light forward or in the direction of the housing rear part 11.

The housing lower part 13 extends forward from a lower end of the housing rear part 11 and is disposed to face the housing upper part 12. For example, the housing lower part 13 may suppress light loss by reflecting light forward or in the direction of the housing rear part 11.

Meanwhile, the housing rear part 11, the housing upper part 12, and the housing lower part 13 may be integrally formed with each other, and a separate reflection layer for reflecting light may be formed between the housing upper part 12 and the housing lower part 13.

Figure 4:
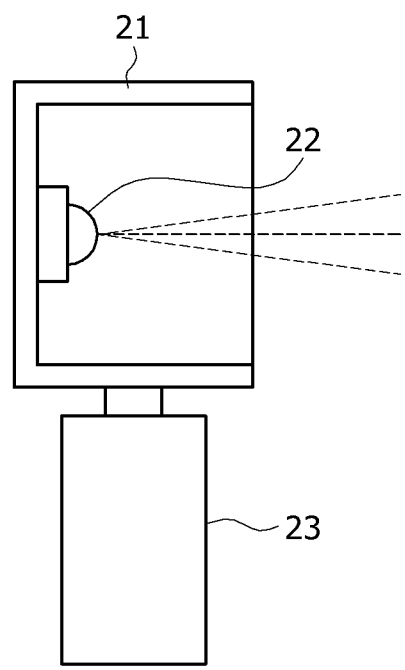
FIG. 4 is a view schematically illustrating a light source unit in accordance with an embodiment of the present disclosure.
Figure 5:
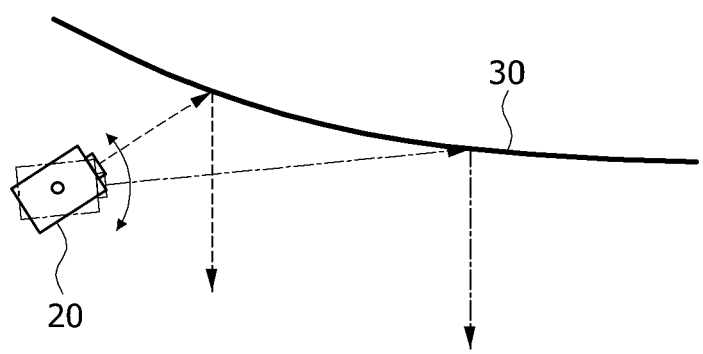
FIG. 5 is a view schematically illustrating a state in which the light source unit in accordance with an embodiment of the present disclosure is rotated.

FIG. 4 is a view schematically illustrating the light source unit 20 in accordance with an embodiment of the present disclosure, and FIG. 5 is a view schematically illustrating a state in which the light source unit 20 in accordance with an embodiment of the present disclosure is rotated. Referring to FIG. 4 and FIG. 5, the light source unit 20 in accordance with an embodiment of the present disclosure includes a light source case part 21 and a light source lamp part 22.

The light source case part 21 is positioned on an edge of the housing unit 10. For example, the light source case part 21 may be disposed at one end or either end of the housing upper part 12 or the housing lower part 13.

The light source lamp part 22 is positioned on the light source case part 21, and emits light to the reflective unit 30 when power is supplied thereto. For example, the light source lamp part 22 includes a substrate for controlling the amount of light and lighting, and a lamp, and an LED may be used as the lamp.

The light source unit 20 in accordance with an embodiment of the present disclosure may further include a light source rotating part 23. The light source rotating part 23 rotates the light source case part 21. For example, when the light source case part 21 is rotated by the light source rotating part 23, the emission area of light emitted by the light source lamp part 22 may be changed.

For example, when the light source case part 21 is fixed, the light source lamp part 22 may have a wide emission angle so that light reaches an entire area of the reflective unit 30. Consequently, when light is emitted, the entire area of the reflective unit 30 may reflect the light to generate grill lighting.

On the other hand, when the light source rotating part 23 rotates the light source case part 21, the light source lamp part 22 may have a narrow emission angle so that light reaches a partial area of the reflective unit 30. Consequently, a process in which light is partially emitted to the reflective unit 30 may be repeated as the light source lamp part 22 is reciprocally rotated, so that a grill lighting area may be changed.

Figure 6:
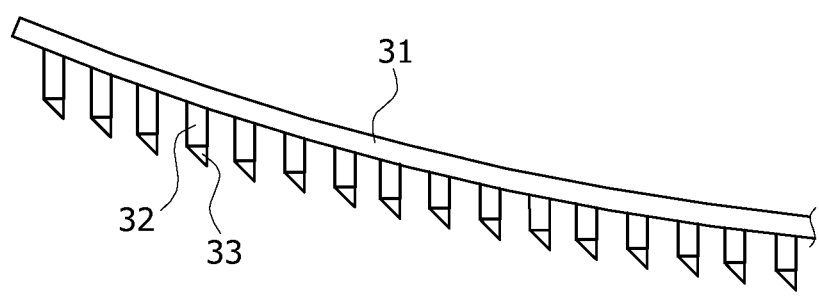
FIG. 6 is a view schematically illustrating a reflective unit in accordance with an embodiment of the present disclosure.

FIG. 6 is a view schematically illustrating the reflective unit 30 in accordance with an embodiment of the present disclosure. Referring to FIG. 6, the reflective unit 30 in accordance with an embodiment of the present disclosure includes a reflective base part 31, a reflective protrusion part 32, and a reflective surface part 33.

The reflective protrusion part 32 protrudes from the reflective base part 31. Such a reflective protrusion part 32 may extend forward from the front surface of the reflective base part 31. The reflective protrusion part 32 may be provided in plural, and the plurality of reflective protrusion parts 32 may be arranged spaced apart from each other in the longitudinal direction of the reflective base part 31.

The reflective surface part 33 is formed at an end of each reflective protrusion part 32 and reflects the light of the light source unit 20 emitted from a side. For example, the reflective surface part 33 may be an inclined surface formed at the end of each reflective protrusion part 32, and light reflected by the reflective surface part 33 may reach the screen unit 40 disposed in front of the reflective unit 30.

Figure 7:
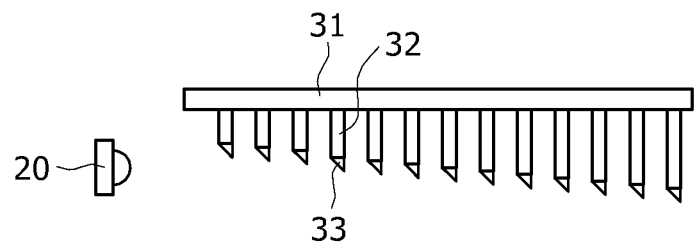
FIG. 7 is a view schematically illustrating a state in which the reflective unit in accordance with an embodiment of the present disclosure reflects light emitted from the light source unit disposed on one side.

FIG. 7 is a view schematically illustrating a state in which the reflective unit 30 in accordance with an embodiment of the present disclosure reflects light emitted from the light source unit 20 disposed on one side. Referring to FIG. 7, the light source unit 20 is disposed at one edge of the housing unit 10. In such a case, a protrusion amount of the reflective surface part 33 is proportional to a distance between each reflective surface part 33 and the light source unit 20. Therefore, light emitted from the light source unit 20 may reach the respective reflective surface parts 33.

Figure 8:
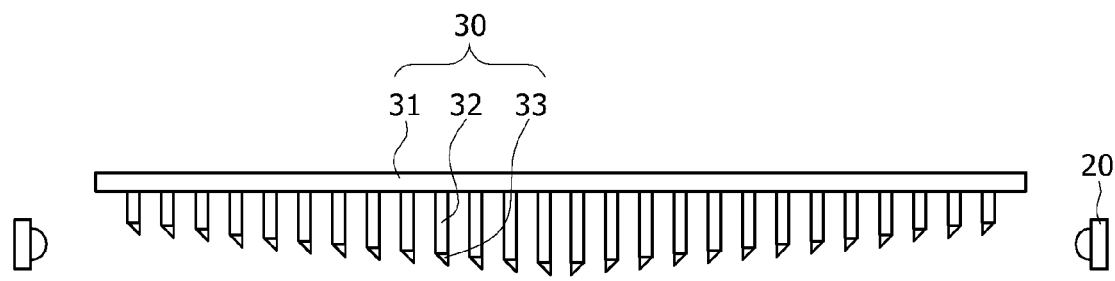
FIG. 8 is a view schematically illustrating a state in which the reflective unit in accordance with an embodiment of the present disclosure reflects light emitted from a pair of light source units disposed on both sides.

FIG. 8 is a view schematically illustrating a state in which the reflective unit 30 in accordance with an embodiment of the present disclosure reflects light emitted from a pair of light source units 20 disposed on both sides. Referring to FIG. 8, the pair of light source units 20 are disposed at both edges of the housing unit 10, respectively. In such a case, a protrusion amount of the reflective surface part 33 is inversely proportional to a distance between each reflective surface part and a center of the reflective base part 31. Therefore, light emitted from the pair of light source units 20 may reach the respective reflective surface parts 33.

Figure 9:
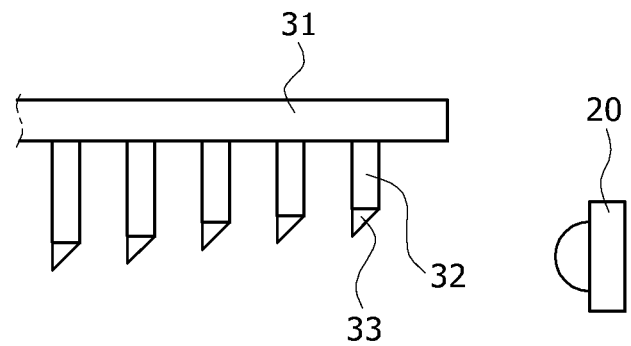
FIG. 9 is a view schematically illustrating the lengths of a plurality of reflective protrusion parts when a reflection base part in accordance with an embodiment of the present disclosure has a planar surface.

FIG. 9 is a view schematically illustrating the lengths of the plurality of reflective protrusion parts 32 when the reflective base part 31 in accordance with an embodiment of the present disclosure has a planar surface. Referring to FIG. 9, the reflective base part 31 has a planar surface, and the lengths of the plurality of reflective protrusion parts 32 protruding from the reflective base part 31 are different from each other. For example, when one light source unit 20 is disposed on one side of the housing unit 10, any one reflective protrusion part 32 may be formed to have a length longer than that of another reflective protrusion part 32 disposed closer to the light source unit 20.

Figure 10:
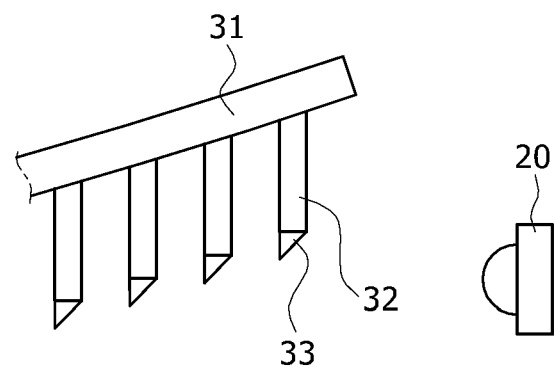
FIG. 10 is a view schematically illustrating a state in which the lengths of the plurality of reflective protrusion parts are substantially the same as each other when the reflection base part in accordance with an embodiment of the present disclosure has a curved surface.
Figure 11:
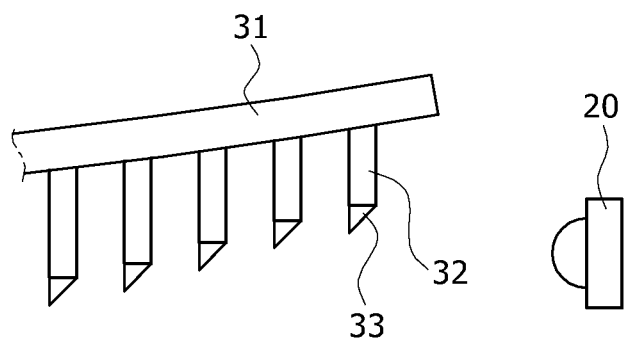
FIG. 11 is a view schematically illustrating a state in which the lengths of the plurality of reflective protrusion parts are different from each other when the reflection base part in accordance with an embodiment of the present disclosure has a curved surface.

FIG. 10 is a view schematically illustrating a state in which the lengths of the plurality of reflective protrusion parts 32 are substantially the same as each other when the reflection base part 31 in accordance with an embodiment of the present disclosure has a curved surface, and FIG. 11 is a view schematically illustrating a state in which the lengths of the plurality of reflective protrusion parts 32 are different from each other when the reflection base part 31 in accordance with an embodiment of the present disclosure has a curved surface. Referring to FIG. 10 and FIG. 11, the reflection base part 31 has a curved surface, and the lengths of the plurality of reflective protrusion parts 32 protruding from the reflective base part 31 are substantially the same as or different from each other. For example, when one light source unit 20 is disposed on one side of the housing unit 10, an end of any one reflective protrusion part 32 may protrude further forward than an end of another reflective protrusion part 32 disposed closer to the light source unit 20. In such a case, the lengths of the reflective protrusion parts 32 may be substantially the same as or different from each other depending on the curvature of the reflective base part 31. Meanwhile, the reflective base part 31 may also have an inclined surface in addition to a curved surface.

Figure 12:
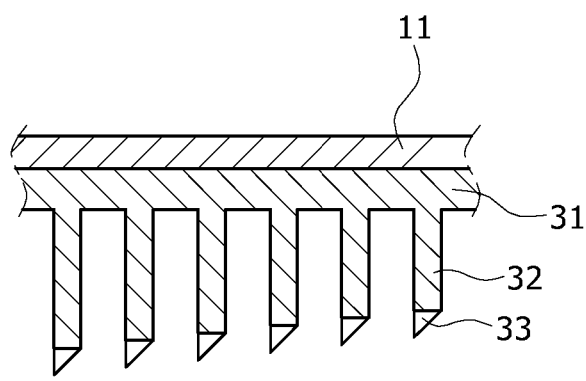
FIG. 12 is a view schematically illustrating a state in which the reflective unit in accordance with an embodiment of the present disclosure is assembled to the housing unit.

FIG. 12 is a view schematically illustrating a state in which the reflective unit 30 in accordance with an embodiment of the present disclosure is assembled to the housing unit 10. Referring to FIG. 12, the reflective unit 30 in accordance with an embodiment of the present disclosure is assembled to the housing unit 10. More specifically, the reflection base part 31 may be screwed or hooked to the housing rear part 11. The reflective unit 30 may be integrally molded, and the reflective unit 30 suitable for generating a grill lighting shape may be positioned on the housing unit 10 and replaced as needed.

Figure 13:
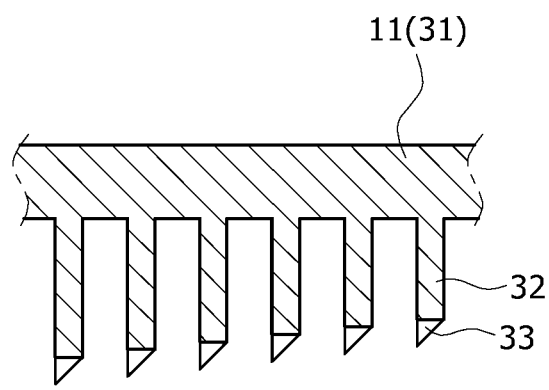
FIG. 13 is a view schematically illustrating a state in which the reflective unit and the housing unit in accordance with an embodiment of the present disclosure are integrally formed with each other.

FIG. 13 is a view schematically illustrating a state in which the reflective unit 30 and the housing unit 10 in accordance with an embodiment of the present disclosure are integrally formed with each other. Referring to FIG. 13, the reflective unit 30 and the housing unit 10 in accordance with an embodiment of the present disclosure are integrally formed with each other. More specifically, the reflection base part 31 may be integrally molded with the housing rear part 11. Therefore, the reflective unit 30 and the housing unit 10 may be integrally molded with each other.

Figure 14:
FIG. 14 is a view schematically illustrating a screen unit in accordance with an embodiment of the present disclosure.

FIG. 14 is a view schematically illustrating the screen unit 40 in accordance with an embodiment of the present disclosure. Referring to FIG. 14, the screen unit 40 in accordance with an embodiment of the present disclosure includes a screen body part 41, a screen blocking part 42, and screen transmitting parts 43.

The screen body part 41 is positioned on the housing unit 10. For example, the screen body part 41 may be detachably assembled to the front ends of the housing upper part 12 and the housing lower part 13.

The screen blocking part 42 is formed inside the screen body part 41 and blocks light transmission. The screen transmitting part 43 is formed inside the screen body part 41 and allows light transmission. For example, the screen blocking part 42 may include a material for blocking light transmission, and may be applied onto or attached to an inner surface of the screen body part 41. The screen transmitting part 43 may be an area except for the screen blocking part 42, and may be separately attached to or applied onto the screen body part 41 to promote light transmission and impart light straightness. In such a case, the screen transmitting parts 43 may have a number and shape corresponding to respective reflective surface parts 33. Meanwhile, in order to generate various types of grill lighting, the screen transmitting part 43 may be variously manufactured in position and shape, and a user may replace the screen unit 40 as needed.

The assembly and operation of the lighting device 1 for a vehicle in accordance with an embodiment of the present disclosure, which has the above structure, will be described as follows.

The light source unit 20 is disposed at one end or the light source units 20 are disposed at both left and right ends of the housing unit 10, and the reflective unit 30 is disposed in the housing unit 10 to reflect light emitted from the light source unit 20. Furthermore, the opened portion of the housing unit 10 is covered by the screen unit 40, and the screen unit 40 faces the reflective unit 30.

In such a case, the reflective unit 30 is integrally formed with the housing unit 10 or may be assembled to the housing unit 10, and the plurality of reflective surface parts 33 are formed to reflect light, which is emitted from a side, toward the screen unit 40.

The lighting device 1 for a vehicle assembled as described above is installed on at least one of the front part, the side part, and the rear part of the vehicle body 100 as a module. That is, the lighting device 1 for a vehicle may be installed on the front surface of an electric vehicle in order to replace the existing radiator grill shape. In addition, the lighting device 1 for a vehicle may be installed on a door or trunk, and may be disposed on the side part or the rear part of the vehicle body 100.

When power is supplied to the light source unit 20, light generated by the light source unit 20 is reflected by the respective reflective surface parts 33, and then passes through the screen unit 40, which enables grill lighting.

In such a case, when the light source unit 20 is fixed, light emitted from the light source unit 20 is reflected by the respective reflective surface parts 33 at the same time, which enables a plurality of grill lightings.

When the light source unit 20 is rotated, light emitted from the light source unit 20 is sequentially reflected by the respective reflective surface parts 33, which enables moving grill lighting.

In the lighting device 1 for a vehicle in accordance with an embodiment of the present disclosure, light of the light source unit 20 emitted from a side is reflected by the reflective unit 30 to transmit the screen unit 40, which makes it possible to generate grill lighting for a vehicle while minimizing the number of light source units 20.

Although the present disclosure has been described with reference to the embodiments illustrated in the drawings, the embodiments of the disclosure are for illustrative purposes only, and those skilled in the art will appreciate that various modifications and equivalent other embodiments are possible from the embodiments. Thus, the true technical scope of the present disclosure should be defined by the following claims.

What is claimed is:

1. A grill lighting device for a vehicle, comprising:
   a housing unit having an opening and connected to a vehicle body including a grill;
   a light source unit positioned on the housing unit and configured to emit light;
   a reflective unit positioned in the housing unit and configured to reflect the light emitted from the light source unit; and
   a screen unit positioned on the housing unit and configured to cover the opening of the housing unit and transmit the light emitted from the light source unit and reflected by the reflective unit to generate a grill lighting.

2. The grill lighting device of claim 1, wherein the housing unit is positioned on one of a front, side and rear parts of the vehicle body.

3. The grill lighting device of claim 1, wherein the housing unit comprises:
   a housing rear part at which the reflective unit is positioned;
   a housing upper part extending forward from an upper portion of the housing rear part and configured to reflect the light emitted from the light source unit; and
   a housing lower part extending forward from a lower portion of the housing rear part, facing the housing upper part and configured to reflect the light emitted from the light source unit.

4. The grill lighting device of claim 1, wherein the light source unit comprises:
   a light source case part positioned on an edge of the housing unit; and
   a light source lamp part positioned on the light source case part and configured to emit light to the reflective unit.

5. The grill lighting device of claim 4, wherein the light source unit further comprises a light source rotating part configured to rotate the light source case part.

6. The grill lighting device of claim 1, wherein the reflective unit comprises:
   a reflective base part;
   a plurality of reflective protrusion parts protruding from the reflective base part; and
   a reflective surface part positioned at an end of each reflective protrusion part and configured to reflect a portion of the light emitted laterally from the light source unit.

7. The grill lighting device of claim 6, wherein:
   the light source unit is positioned at one edge of the housing unit, and
   a protrusion amount of each reflective surface part is proportional to a distance between each reflective surface part and the light source unit.

8. The grill lighting device of claim 6, wherein:
   the light source unit is disposed at both edges of the housing unit, and
   a protrusion amount of each reflective surface part is inversely proportional to a distance between each reflective surface part and a center of the reflective base part.

9. The grill lighting device of claim 6, wherein:
   the reflective base part has a planar surface, and
   at least some of the reflective protrusion parts adjacent to each other have mutually different lengths.

10. The grill lighting device of claim 6, wherein:
    the reflection base part has a curved surface, and
    at least some of the reflective protrusion parts have mutually different lengths.

11. The grill lighting device of claim 1, wherein the reflective unit and the housing unit are assembled together.

12. The grill lighting device of claim 1, wherein the reflective unit is integral to the housing unit.

13. The grill lighting device of claim 1, wherein the screen unit comprises:
- a screen body part positioned on the housing unit;
- a screen blocking part positioned within the screen body part and configured to block light transmission; and
- a screen transmitting part positioned within the screen body part and configured to allow light transmission.

* * * * *